US006927686B2

(12) United States Patent
Nieters et al.

(10) Patent No.: US 6,927,686 B2
(45) Date of Patent: Aug. 9, 2005

(54) METHOD AND APPARATUS FOR INTERNET ENABLED, WIRELESS REMOTE SENSOR MEASUREMENT

(75) Inventors: Edward James Nieters, Burnt Hills, NY (US); Robert John Filkins, Niskayuna, NY (US); Carl Stephen Lester, Porter Corners, NY (US)

(73) Assignee: General Electric Company, Schenectady, NY (US)

( * ) Notice: Subject to any disclaimer, the term of this patent is extended or adjusted under 35 U.S.C. 154(b) by 97 days.

(21) Appl. No.: 10/248,023

(22) Filed: Dec. 11, 2002

(65) Prior Publication Data

US 2004/0113773 A1 Jun. 17, 2004

(51) Int. Cl.[7] .............................. G08B 1/08; H04Q 7/00
(52) U.S. Cl. .............................. 340/539.22; 340/539.17
(58) Field of Search ........................ 340/539.22, 870.03, 340/870.06, 7.29, 539.11, 539.17; 455/88

(56) References Cited

U.S. PATENT DOCUMENTS

| | | | | | |
|---|---|---|---|---|---|
| 5,917,405 | A | * | 6/1999 | Joao | 340/426.17 |
| 6,023,223 | A | * | 2/2000 | Baxter, Jr. | 340/531 |
| 6,271,752 | B1 | * | 8/2001 | Vaios | 340/541 |
| 6,289,208 | B1 | | 9/2001 | Hareyama | |
| 6,421,354 | B1 | * | 7/2002 | Godlewski | 370/466 |
| 6,426,917 | B1 | | 7/2002 | Tabanou et al. | |
| 6,487,426 | B1 | * | 11/2002 | Haber | 455/575.1 |
| 6,646,564 | B1 | * | 11/2003 | Azieres et al. | 340/679 |
| 6,670,810 | B2 | * | 12/2003 | Duncan et al. | 324/244.1 |
| 6,686,838 | B1 | * | 2/2004 | Rezvani et al. | 340/506 |
| 6,703,930 | B2 | * | 3/2004 | Skinner | 340/539.11 |
| 6,727,811 | B1 | * | 4/2004 | Fendis | 340/506 |
| 2002/0080938 | A1 | * | 6/2002 | Alexander et al. | 379/106.01 |

* cited by examiner

*Primary Examiner*—Jeffery Hofsass
*Assistant Examiner*—Eric Blount
(74) *Attorney, Agent, or Firm*—Foley & Lardner LLP

(57) ABSTRACT

A method for remotely monitoring at least one sensor and a measurement system. The method includes making a first measurement using a first sensor of the at least one sensor. The method also includes converting the first measurement into a first data signal; and transmitting the first data signal via a wireless connection to a first processor. The measurement system includes at least one sensor unit having at least one sensor for making a first measurement; and a first wireless transceiver coupled to the at least one sensor for transmitting a data signal based on the first measurement. The measurement system includes a second wireless transceiver arranged for receiving the data signal from the first wireless transceiver, and a first processor coupled to the second wireless transceiver arranged for receiving the data signal from the second wireless transceiver.

14 Claims, 1 Drawing Sheet

METHOD AND APPARATUS FOR INTERNET ENABLED, WIRELESS REMOTE SENSOR MEASUREMENT

BACKGROUND OF THE INVENTION

This invention is related generally to an apparatus for remotely monitoring equipment via wireless communication, where the system may be internet enabled.

Remote sensor measurement systems are known. Obtaining measurement data from a sensor in such a measurement system typically involves an instrument connected to a sensor probe via wiring. The wire(s) typically transmit power and/or a trigger pulse from a measurement instrument to the sensor and a signal from the sensor back to the instrument. The instrument analyzes the signal to provide data for a measurement. Some instruments are capable of using multiple sensors all of which must be wired to the base instrument. Some of these instruments can present the data on a display, store it for later analysis, or communicate it to another computer.

One such remote sensor system measures the air gap at the top of a silo to provide an indication of the amount of material remaining in the silo. In this system, a plurality of sensors, in this case a plurality of air-coupled transducers, are fixed to the top of the silo. The transducer returns a measurement signal to a computer instrument, which uses the measurement signal to determine the air gap in the silo. Given the height and shape of the silo, the amount of material remaining within the silo can be determined.

The computer instrument is wired to the air-coupled transducers. Wires from the computer instrument carry power and a trigger pulse to each transducer. The computer instrument is then contacted periodically via a modem to retrieve values for the material levels in the silo.

It is costly to run wiring and conduit to the sensors using this approach. In addition, the data must be obtained as a string of values when the computer instrument is called. A central processing facility retrieving that data at a location remote from the computer instrument typically must convert this data to a readable format such as would be used in a web page display.

SUMMARY OF THE INVENTION

In accordance with one aspect of the present invention, there is provided a method for remotely monitoring at least one sensor. The method comprises: making a first measurement using a first sensor of the at least one sensor; converting the first measurement into a first data signal; and transmitting the first data signal via a wireless connection to a first processor.

In accordance with another aspect of the present invention, there is provided a method for remotely monitoring at least one sensor. The method comprises: (a) making a measurement using each sensor of the multiple sensors; (b) converting the measurement of each sensor into a data signal; and (c) transmitting the data signal via a wireless connection to a first processor.

In accordance with another aspect of the present invention, there is provided a measurement system. The measurement system comprises: at least one sensor unit comprising: at least one sensor for making a first measurement; and a first wireless transceiver coupled to the at least one sensor for transmitting a data signal based on the first measurement; and a second wireless transceiver arranged for receiving the data signal from the first wireless transceiver; and a first processor coupled to the second wireless transceiver arranged for receiving the data signal from the second wireless transceiver.

In accordance with another aspect of the present invention, there is provided a measurement system. The measurement system comprises: a plurality of sensor units, each sensor unit comprising: at least one sensor for making a measurement; a first wireless transceiver coupled to the at least one sensor for transmitting a data signal based on the measurement; a second wireless transceiver arranged for receiving the data signal from each of the first wireless transceivers; and a first processor coupled to the second wireless transceiver arranged for receiving the data signal from the second wireless transceiver.

DETAILED DESCRIPTION OF THE PREFERRED EMBODIMENTS

Figure 1:
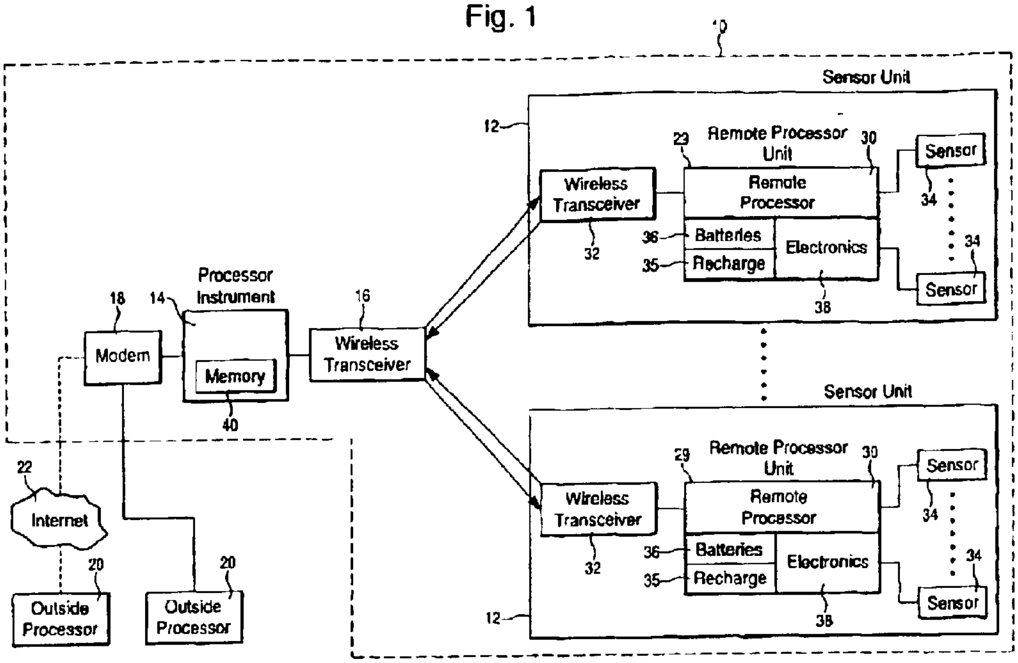
FIG. 1 is a schematic of a measurement system according to a preferred embodiment of the invention.

Reference will now be made in detail to presently preferred embodiments of the present invention. Wherever possible, the same reference numbers will be used throughout the drawings to refer to the same or like parts.

The present inventors have realized that providing a wireless connection between a sensor unit, with a number of sensors, and an instrument computer, can solve the above mentioned problems of known systems where the instrument computer is connected to the sensors via wiring and conduits.

FIG. 1 illustrates a preferred embodiment of the invention with measurement system 10. The measurement system 10 includes a sensor unit 12 which may transmit signals back and forth with a computer or processor instrument 14. The processor instrument 14 transmits signals back and forth with one or more sensor units 12 via a wireless transceiver 16.

The processor instrument 14 can communicate with and send signals back and forth with outside processors 20. The outside processors 20 in this embodiment are external to the system 10 as shown in FIG. 1. The system 10 is shown enclosed by dashed lines. The processor instrument 14 can communicate with the outside processors 20 via a modem 18, for example. This communication via modem 18 may be implemented via an internet connection to an outside processor 20 or a direct phone connection to an outside processor 20 as shown in FIG. 1. The processor instrument 14 may be, for example, a Tiny Internet Interface (TINI) machine from Dallas Semiconductor.

The sensor units 12 each comprise a remote processor unit 29, i.e., a processor unit remote from the processor instrument 14, a wireless transceiver 32, and one or more sensors 34. The remote processor unit 29 may receive measurement data via a measurement signal from the one or more sensors 34 of the sensor units 12. In this regard the remote processor unit 29 includes electronics 38, as is known in the art, for receiving a data signal from the sensors 34, and passing this signal on, and modifying it if necessary, to a remote processor 30 of the remote processor unit 29. The remote processor 30 may perform a data processing operation on the data from the data signal received from the one or more sensor units 34.

The particular type of sensor units 34 will depend upon the particular application. The sensor units 34 may be, for example, transducers for measuring an air gap at the top of a silo. In this case, the sensor units 34 may be attached to the top of the silo. The sensor units 34 may then provide a data signal to the remote processor unit 29. The remote processor 30 may perform a data processing operation on the data, such as to provide an indication of the amount of material left in the silo. The processed data may be used to provide image data of the inside of the silo, so that a user may obtain a simulated view of the material in the silo.

Alternatively, the raw data from the sensors 34 may be sent along as a data signal to the wireless transceiver 16 via wireless transceiver 32, and a processing operation may then be performed at the processor instrument 14, or the raw data may be passed along again to the outside processors 20 and a processing operation may be performed at the outside processors 20. Thus, data processing of the data may be performed at any combination of the remote processor 30, processor instrument 14 or outside processor 20, or not performed at all.

The sensors 34 may alternatively be temperature or ultrasound sensors. The sensors 34 may also be a combination of different types of sensors, such as for example, a combination of temperature and ultrasound sensors. A combination of different types of measurement data may then be passed on as a data signal from the sensors 34, and then ultimately be processed at one or more of the remote processor 30, the processor instrument 14 and an outside processor 20.

One or more of the sensors 34 may be mounted on a stationary object, such as a silo, or on a object capable of movement, such as a human being, an animal or a vehicle in operation. Thus, one or more of the sensors 34 may be mounted on a moving object. This embodiment provides advantages over systems where the processor instrument is ultimately in connection with the sensors through wires, where it may not be feasible to attach the sensors to a moving object.

The sensors 34 may be connected to the electronics 38 via wires, fiber optics, or may communicate wirelessly, as desired.

The remote processor unit 29 may include batteries 36 to provide power for at least one of the remote processor 30 and at least one of the sensors 34. The batteries 36 may also provide power to both the sensors 34 and the remote processor 30. Alternatively, the power to the remote processor 20 and/or the sensors 34 may be provided from a power source external to the remote processor unit 29 or at least from a source other than batteries.

The remote processor unit 29 may have the capability to use the batteries 36 or an outside power source for power. Thus, the remote processor unit 29 could use outside power at a location where such power is available, but use batteries 36 at a location where such outside power is not available.

Additionally, the remote processor unit 29 may include recharging circuitry 35, that allows for the batteries 36 to be recharged as needed.

The remote processor 30 of the remote processor unit 29 may comprise a central processing unit (CPU), such as a Motorola based CPU.

The wireless transceiver 32 communicates and sends/receives data signals and/or instruction signals from the wireless transceiver 16. These wireless transceivers may be radio frequency or infrared transceivers, for example, which communicate via radio frequencies and infrared signals, respectively. Other types of transceivers are also possible, and the type of transceiver will depend upon the particular application. For example, if there exists a line of sight between the two transceivers 32 and 16, infrared transceivers, which emit and receive infrared light between the transceivers 32 and 16 may be used.

The processor instrument 14 may also include a memory 40 associated with it for storing raw or processed data received from the remote processor unit 29.

A web server (not shown) may be installed on the processor instrument 14. In this case, data at processor instrument 14 may be viewed directly using a web browser from an outside processor 20, which is connected to the processor instrument 14 via the internet 22 and modem 18.

The outside processor 20 may part of a central facility that receives data from one or more systems similar to the system 10. This allows for an outside processor 20 with powerful analysis capability to perform a more powerful analysis of the data from the sensors 34 at a central location.

The processor instrument 14 may communicate with a number of sensor units 12. Thus, the processor instrument 14 may monitor sensors 34 at a number of different locations. The precise method for monitoring sensor units 12 and corresponding sensors 34 may be as desired. For example, the sensor units 12 may be monitored in a round robin fashion. In this case, the processor instrument 14 may organize the sensor units 12 in a particular order, and then monitor the sensor units 12 in that order in a cyclical fashion.

The system 10 may be operated by the following methods, for example. A first sensor of the sensors 34 makes a first measurement. The first measurement is converted into a first data signal and then the first data signal is ultimately transmitted via a wireless connection to the processor instrument 14 via the wireless transceivers 32 and 16. The data transferred to the processor instrument 14 may be stored in the memory 40 associated and located with the processor instrument 14. This stored data may be transmitted to one of the outside processors 20 via the modem 18. The transmission to one of the outside processors 20 may be accomplished via the internet 22 or via a direct phone connection.

In general, more than one sensor (of a single sensor unit 12 or more than one sensor unit) may be monitored. In this case a second measurement using a second sensor is performed. As with the first measurement, the second measurement is converted into a second data signal and then the second data signal is ultimately transmitted via a wireless connection to the processor instrument 14 via the transceivers 32 and 16. In this case, if one sensor is malfunctioning, data from at least one normally operating sensor will be provided to the outside processor 20.

Data processing of the measurement data may be performed at any or all of the remote processor 30, the processor instrument 14 and the outside processor 20. If the data processing is performed at the remote processor 30, the processed data may be converted into a data signal as the first data signal.

Alternatively converting first measurement may include converting raw measurement data into the first data signal, where the raw measurement data is received from the remote processor 30. The raw data corresponding to the first data signal may be stored in the memory 40 associated with the processor instrument 14. This raw data from the stored data may be transmitted to one of the outside processors 20. Data processing of the raw data may be performed at one or more of the outside processors 20.

In general, it may be desirable to remotely monitor multiple sensors using the system. In this case, each sensor of the multiple sensors may make a measurement, and the measurement of each sensor converted into a data signal.

The data signal may be transmitted via a wireless connection via the transceivers 16 and 32 to the processor instrument 14. The transmission of the data signal may be performed in a round robin fashion. The sensors 34 may also be controlled to perform the measurements in a round robin fashion. The conversion of the measurements may also be performed in a round robin fashion. Alternatively, the sensors 34 may perform measurements continuously, for example, and the conversion to a data signal may also be performed continuously, for example, instead of in a round robin fashion.

While the invention has been described in detail and with reference to specific embodiments thereof, it will be apparent to one skilled in the art that various changes and modifications can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for remotely monitoring at least one sensor, comprising:

making a first measurement using a first sensor of the at least one sensor;

performing data processing of data from the first measurement at a remote processor of a remote processor unit, remote relative to a first processor, to provide first processed data;

converting the first processed data into a first data signal;

transmitting the first data signal via a first wireless transceiver of the remote processor unit to a second wireless transceiver connected to the first processor;

storing data corresponding to the first data signal in a memory associated with the first processor; and transmitting data derived from the stored data to an outside processor via a connection unit providing separate communication from the second wireless transceiver.

2. The method of claim 1, further comprising:

making a second measurement using a second sensor of the at least one sensor;

performing data processing of data from the second measurement at the remote processor to provide second processed data;

converting the second processed data into a second data signal; and transmitting the second data signal via a the first wireless transceiver to the second wireless transceiver.

3. A measurement system comprising:

at least one sensor unit comprising:

at least one sensor for making a first measurement;

a remote processor unit comprising a remote processor, remote relative to a first processor, for performing data processing on the first measurement to provide first processed data; and a first wireless transceiver coupled to the remote processor for transmitting a data signal based on the first processed data;

a second wireless transceiver arranged for receiving the data signal from the first wireless transceiver; and a first processor instrument including a first processor and a memory, the first processor instrument coupled to the second wireless transceiver arranged for receiving the data signal from the second wireless transceiver, the first processor including a connection unit for connecting to an outside processor, the connection unit providing separate communication from the second wireless transceiver.

4. The measurement system of claim 3, wherein the at least one sensor unit further comprises a battery accepting unit for accepting at least one battery providing power to at least one of the remote processor and the at least one sensor.

5. The measurement system of claim 3, wherein the at least one sensor comprises at least one transducer arranged on a silo for measuring the amount of material in the silo.

6. The measurement system of claim 3, wherein the at least one sensor is mounted on a moving object.

7. The measurement system of claim 3, wherein the at least one sensor comprises one of a temperature and an ultrasound sensor.

8. The measurement system of claim 3, wherein the connection unit comprises a modem for transmitting a second data signal based on the first data signal to the internet.

9. The measurement system of claim 8, wherein the modem is adapted to connect to the internet via one of a phone line wire and a cellular connection.

10. The measurement system of claim 3, wherein the first processor is part of a server upon which is installed a web browser.

11. The measurement system of claim 3, wherein the first and second transceivers comprise one of radio frequency and infrared transceivers.

12. The measurement system of claim 3, wherein the first processor is a Java-enabled computer.

13. The method of claim 1, wherein the at least one sensor comprises a plurality of sensors.

14. The measurement system of claim 3, wherein the at least one sensor unit comprises a plurality of sensor units.

* * * * *

UNITED STATES PATENT AND TRADEMARK OFFICE

CERTIFICATE OF CORRECTION

PATENT NO. : 6,927,686 B2
DATED : August 9, 2005
INVENTOR(S) : Edward James Nieters et al.

It is certified that error appears in the above-identified patent and that said Letters Patent is hereby corrected as shown below:

Column 5,
Line 51, delete “a”.

Signed and Sealed this

Sixth Day of December, 2005

JON W. DUDAS
*Director of the United States Patent and Trademark Office*